3,224,943
PROCESS FOR RETARDING THE GROWTH
OF TUMORS
Herbert H. Espy, Wilmington, Del., assignor to Hercules Powder Company, Wilmington, Del., a corporation of Delaware
No Drawing. Filed Mar. 6, 1964, Ser. No. 350,096
3 Claims. (Cl. 167—78)

This invention relates to a method for inhibiting the growth of tumors and to a composition useful for such treatment. More specifically, it relates to a method for inhibiting malignant tumor growth in mammals.

Although the field of cancer therapy has been the subject of extensive study, particularly in recent years, so far extremely few effective substances have been found. Thus, any extension of the range of available agents represents a significant contribution to the knowledge in this important field.

It has now been discovered that the water-soluble copolymers prepared from divinyl ether and maleic anhydride in mole ratios of 1:2 and the physiologically tolerated salts thereof possess remarkably high tumor-inhibitory activity. These valuable copolymers have an RSV of from about 0.05 to about 2.0 and can be visualized as follows:

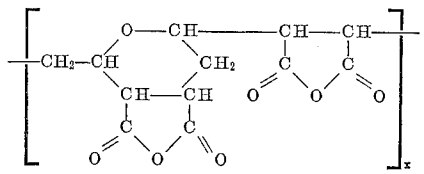

It is, of course, obvious that these copolymers hydrolyze on contact with water to produce the free acid.

The term "reduced specific viscosity" (RSV), which is a function of molecular weight, is used herein to designate the $\eta_{sp/c}$ determined on a 0.1% solution of the copolymer in a 1 molar aqueous solution of sodium hydroxide measured at a temperature of 25° C.

The copolymers used in the process of this invention can be produced by copolymerizing divinyl ether and maleic anhydride in an aromatic diluent at a mole ratio of about 1:2 using a free radical initiator (e.g., benzoyl peroxide, azo bis(isobutyronitrile), etc.). The use of chain transfer agents (i.e., $CCl_4$, $BrCCl_3$, etc.) in the copolymerization is optional.

Exemplary of the physiologically tolerated salts of these copolymers which are useful in this invention are the water-soluble salts of alkali metals, as for example, sodium potassium, etc.; ammonium salts; salts of such amines as methylamine, dimethylamine, ethylamine, diethylamine, butylamine, aniline, methoxyamine, piperidine, morpholine, etc.; mixed salts containing ammonia and a primary or secondary amine, etc.

Unlike many carcinostatic agents, the copolymers used in this invention are relatively nontoxic. For example, when injected intraperitoneally, they were found to have an $LD_{50}$ of greater than 800 mg./kg. By the term "$LD_{50}$" is meant lethal dose to 50% of the animals being tested.

On the other hand, the copolymers of this invention show therapeutic activity at dosages as low as 2.5 mg./kg. when injected intraperitoneally. Thus it can be seen that there is afforded a great latitude between therapeutically active dosages and dosages which are toxic.

The activity of these copolymers is particularly pronounced against mammary adenocarcinoma 755. According to the procedure of Gellhorn et al. (Cancer Research, Supplement III, page 38, 1955), treated groups of 10 mice each are employed, together with similar groups of untreated controls. Dosage is 0.5 cc. solution of copolymer, administered daily in all cases. Therapy is initiated one day after transplantation of the tumor and is continued for eleven days. At the conclusion of the experiment, the animals are weighed, sacrificed and the tumors are excised and weighed. The copolymers of the instant invention are found to possess remarkably high potency for inhibiting growth of the tumors at tolerated dosages. Furthermore, even where the tumor is permitted to become established by delaying initiation of the treatment, retardation of growth is achieved. In addition to intraperitoneal and subcutaneous administered, treatment by the oral route is also effective.

The copolymers are also effective in inhibiting Lewis lung carcinoma. The procedure used was to employ treated groups of 6 mice, together with similar groups of untreated controls. Dosage was by intraperitoneal injection daily. Therapy was initiated one day after transplantation of the tumor and was continued for eleven days. At the conclusion of the experiment, the animals were weighed and sacrificed and the tumors were excised and weighed. Here again, the copolymers were found to significantly retard growth of the tumors at tolerated dosage levels.

Tests also show that the instant copolymers are effective in inhibiting Crocker sarcoma 180, human sarcoma HS–1 and Dunning ascites leukemia.

While these copolymers exhibit very high effectiveness when administered either by the oral or parenteral route, treatment by the parenteral route will usually be preferred. The copolymers can be employed in aqueous solution or dissolved in physiologically saline. In addition, various pharmaceutical preparations can be advantageously compounded which contain the active substance along with liquid or solid diluents. Solid preparations for extemperaneous dilution can be formulated employing various buffering agents as well as local anesthetics and other medicinal agents such as antibiotics, hypnotics, analgesics, etc., and inorganic salts to afford desirable pharmacological properties to the composition.

Dosages of the order of 2.0 to 500 mg./kg. daily of the copolymer are highly effective in inhibiting tumors in animals, depending on the route of administration and duration of treatment. Since these active copolymers are stable and widely compatible, they can be administered in solution or suspension in a variety of pharmacological acceptible vehicles including water, propylene glycol, diethylcarbonate, glycerol, or oils such as peanut oil, sesame oil, olive oil, etc.

In addition to the conventional oral, intramuscular, subcutaneous, intravenous and intraperitoneal administration routes, these compounds can also be employed in conjunction with profusion procedures wherein the tumor cite is isolated from the main circulatory system for treatment.

In some cases it may be desirable to employ these copolymers in combination with one or more other carcinostatic agents. For this purpose, compositions containing from about 10 to 90% of the copolymers are useful. Known carcinostatic agents which can be employed in such combinations include the nitrogen mustard type carcinostats, 6-mercaptopurine, 8-azaguanine, urethane, 6-diazo-5-oxo-1-norleucine, azaserine, trimethylenemelamine, mitocyclin c, triethylenephosphoramide, 1,4-dimethylsulfonyloxybutane, aminoiminomethanesulfinic acids, dithiocarbamates, the carcinostatic folic acid analogs, ethyl carbamate, etc.

The following example shows the preparation of a typical divinyl ether-maleic anhydride copolymer.

A polymerization vessel was charged with 197.2 parts of maleic anhydride, 704 parts of benzene and 1276 parts of carbon tetrachloride. After dissolution of the maleic anhydride, the solution was sparged with nitrogen and 70.2 parts of distilled divinyl ether was added with agitation. Then with vigorous agitation there was added 1.45 parts of benzoyl peroxide dissolved in benzene. Within 20 seconds, copolymerization started and the solution became cloudy and then gelatinous. After about 3½ hours, the swollen polymer was removed and repeatedly extracted with benzene and then dried under vacuum. The resulting divinyl ether-maleic anhydride copolymer had an RSV of 0.34 (molecular weight of approximately 36,000) and represented a conversion of 89%. The divinyl ether and maleic anhydride were present in the copolymer in the molar ratio of 1:2.

It will be understood that by conducting the copolymerization under various reaction conditions in the presence of different free radical initiators and in the presence or absence of chain transfer agents, copolymers of vraious molecular weights can be prepared.

The following examples are presented to illustrate the process of this invention.

EXAMPLE 1

A divinyl ether-maleic anhydride copolymer containing divinyl ether and maleic anhydride in a 1:2 mole ratio and having an RSV of 0.2 (molecular weight of approximately 15,000) was tested for effectiveness in inhibiting growth of mammary adenocarcinoma CA 755 according to the procedure of Gellhorn et al. (loc. cit.). Administration of the copolymer was by intraperitoneal injection in saline solution, using BDF1 mice. The results are shown in Table I.

*Table I*

| Dosage, mg./kg. | Animal Weight Difference Treated Minus Control, g. | Survivors | | Tumor Weight Treated/ Control Percent |
|---|---|---|---|---|
| | | Treated | Total | |
| 2.5 | −1.5 | 10 | 10 | 49 |
| 5.0 | −1.2 | 10* | 10 | 55 |
| 10.0 | −2.3 | 8 | 10 | 41 |
| 20.0 | −1.3 | 9 | 10 | 22 |
| 40.0 | −2.2 | 9 | 10 | 9 |
| 80.0 | −3.1 | 6 | 10 | |

EXAMPLE 2

A divinyl ether-maleic anhydride copolymer containing divinyl ether and maleic anhydride in a 1:2 mole ratio and having an RSV of 1.5 (molecular weight of approximately 450,000) was tested exactly as described in Example 1. The results are shown in Table II.

*Table II*

| Dosage, mg./kg. | Animal Weight Difference Treated Minus Control, g. | Survivors | | Tumor Weight Treated/ Control Percent |
|---|---|---|---|---|
| | | Treated | Total | |
| 2.5 | −1.5 | 9 | 10 | 73 |
| 5.0 | −1.8 | 10 | 10 | 44 |
| 10.0 | −1.0 | 10 | 10 | 59 |
| 20.0 | −0.5 | 10 | 10 | 29 |
| 40.0 | −0.7 | 8 | 10 | 29 |
| 80.0 | −2.3 | 8 | 10 | 13 |

EXAMPLE 3

A divinyl ether-maleic anhydride copolymer containing divinyl ether and maleic anhydride in a 1:2 mole ratio and having an RSV of 0.34 (molecular weight of approximately 36,000) was tested for effectiveness in inhibiting the growth of mammary adenocarcinoma CA 755 as in Example 1 except administration of the copolymer was by subcutaneous injection. The results are shown in Table III.

*Table III*

| Dosage, mg./kg. | Animal Weight Difference Treated Minus Control, g. | Survivors | | Tumor Weight Treated/ Control Percent |
|---|---|---|---|---|
| | | Treated | Total | |
| 2.5 | 0.4 | 10 | 10 | 87 |
| 5.0 | −0.3 | 9 | 10 | 73 |
| 80.0 | −3.1 | 9 | 10 | 14 |
| 160.0 | −3.2 | 9 | 10 | 17 |

EXAMPLE 4

The copolymer described in Example 3 was tested for effectiveness in inhibiting the growth of mammary adenocarcinoma CA 755 using the procedure described in Example 1 except for the following variations. Administration of the copolymer was by intraperitoneal injection in carboxymethylcellulose, using C57BL/6 mice. Dosages were given every third day, beginning one day after transplantation of the tumor. The mice were sacrificed on the twelfth day. The results are shown in Table IV.

*Table IV*

| Dosage, mg./kg. | Animal Weight Difference Treated Minus Control, g. | Survivors | | Tumor Weight Treated/ Control Percent |
|---|---|---|---|---|
| | | Treated | Total | |
| 30.0 | −0.4 | 9 | 10 | 34 |
| 60.0 | 0 | 10 | 10 | 42 |
| 120.0 | 0.4 | 8 | 10 | 14 |
| 240.0 | 1.2 | 9 | 10 | 23 |

EXAMPLE 5

The copolymer described in Example 3 was tested for effectiveness in inhibiting the growth of mammary adenocarcinoma CA 755 by the procedure described in Example 1 except the administration was by the oral route. The results are shown in Table V.

*Table V*

| Dosage, mg./kg. | Animal Weight Difference Treated Minus Control, g. | Survivors | | Tumor Weight Treated/ Control Percent |
|---|---|---|---|---|
| | | Treated | Total | |
| 45.0 | 0.8 | 10 | 10 | 75 |
| 90.0 | 0.5 | 10 | 10 | 60 |
| 400.0 | −2.6 | 8 | 10 | 52 |

EXAMPLE 6

The divinyl ether-maleic anhydride copolymer described in Example 3 was tested for effectiveness in inhibiting the growth of Lewis lung carcinoma. The tumor was implanted subcutaneously in the axillary region of six BDF1 mice. Therapy was initiated one day after transplantation of the tumor. Intraperitoneal injections of the copolymer in saline solution were administered once daily for a total of eleven days. Controls received injections of 0.85% saline. On the twelfth day after tumor implantation, the surviving animals were weighed and sacrificed and the tumors were excised and weighed. The results are shown in Table VI.

Table VI

| Dosage, mg./kg. | Animal Weight Difference Treated Minus Control, g. | Survivors | | Tumor Weight Treated/ Control Percent |
|---|---|---|---|---|
| | | Treated | Total | |
| 2.0 | −1.6 | 6 | 6 | 76 |
| 4.0 | −0.9 | 6 | 6 | 49 |
| 8.0 | −0.2 | 6 | 6 | 38 |
| 16.0 | −0.8 | 6 | 6 | 25 |
| 32.0 | −0.3 | 6 | 6 | 32 |

EXAMPLE 7

The copolymer described in Example 3 was tested for effectiveness in inhibiting the growth of Crocker sarcoma 180. The tumor was implanted subcutaneously in the axillary region of six Swiss white mice weighing 18 to 22 grams. Therapy was begun 24 hours after implant. Intraperitoneal injections of the copolymer in saline solution were administered once daily for a total of 7 days. Controls received injections of 0.85% saline. On the eighth day after tumor implantation, the surviving animals were weighed and sacrificed. The results are shown in Table VII.

Table VII

| Dosage, mg./kg. | Animal Weight Difference Treated Minus Control, g. | Survivors | | Tumor Weight Treated/ Control Percent |
|---|---|---|---|---|
| | | Treated | Total | |
| 125 | 2.2 | 6 | 6 | 49 |

EXAMPLE 8

The divinyl ether-maleic anhydride copolymer described in Example 3 was tested for effectiveness in inhibiting the growth of human sarcoma HS-1. The tumor was implanted on vascularized area of the choria-allantoic membrane of 9-day-old embryonated eggs. The procedure used was to employ treated groups of 6 eggs, together with similar groups of untreated controls. The third day after implantation the copolymer was injected into the yolk sac of the eggs as a suspension in olive oil. Only one dose was administered. On the ninth day the treated eggs and controls were sacrificed and the tumors were excised and weighed. The results are shown in Table VIII.

Table VIII

| Dosage, mg./kg. | Animal Weight Difference Treated Minus Control, g. | Survivors | | Tumor Weight Treated/ Control Percent |
|---|---|---|---|---|
| | | Treated | Total | |
| 2.5 | −2.3 | 6 | 6 | 47 |
| 5.0 | −1.4 | 5 | 6 | 46 |
| 20.0 | −1.9 | 5 | 6 | 46 |

EXAMPLE 9

The copolymer described in Example 3 was tested for effectiveness in inhibiting the growth of Dunning ascites leukemia. The tumor was injected intraperitoneally into groups of six Fischer/344 rats. Therapy was begun 24 hours after implant. Intraperitoneal injections of the copolymer in saline solution were administered once daily for a total of 5 days. Controls received injections of 0.85% saline. Survival times are shown in Table IX.

Table IX

| Dosage, mg./kg. | Animal Weight Difference Treated Minus Control, g. | Survival Time Days | | Percent T/C |
|---|---|---|---|---|
| | | Treated | Control | |
| 7.5 | −16 | 10.0 | 8.0 | 125 |
| 15.0 | −13 | 11.5 | 8.0 | 143 |
| 30.0 | −14 | 12.0 | 8.0 | 150 |
| 60.0 | −18 | 14.5 | 8.0 | 181 |

EXAMPLE 10

The ammonium salt of a divinyl ether-maleic anhydride copolymer containing divinyl ether and maleic anhydride in a 1:2 mole ratio and having an RSV of 1.4 (molecular weight of approximately 400,000) was tested for effectiveness in inhibiting growth of mammary adenocarcinoma CA 755 exactly as described in Example 1. The results are tabulated below.

| Dosage, mg./kg. | Animal Weight Difference Treated Minus Control, g. | Survivors | | Tumor Weight Treated/ Control Percent |
|---|---|---|---|---|
| | | Treated | Total | |
| 80.0 | −0.3 | 7 | 10 | 28 |

EXAMPLE 11

The ammonium salt described in Example 10 was tested for effectiveness in inhibiting growth of Crocker sarcoma 180 exactly as described in Example 7. The results are tabulated below.

| Dosage, mg./kg. | Animal Weight Difference Treated Minus Control, g. | Survivors | | Tumor Weight Treated/ Control Percent |
|---|---|---|---|---|
| | | Treated | Total | |
| 250 | −1.9 | 4 | 6 | 24 |

What I claim and desire to protect by Letters Patent is:

1. A process for retarding the growth of malignant tumors selected from the group consisting of mammary adenocarcinoma, Lewis lung carcinoma, Dunning ascites leukemia, Crocker sarcoma and human sarcoma HS-1 which comprises administering to a malignant tumor-bearing mammal a daily dosage of from about 1 mg. to about 500 mg. per kilogram of body weight of an inhibiting agent selected from the group consisting of divinyl ether-maleic anhydride copolymers and physiologically tolerated salts of divinyl ether-maleic anhydride copolymers, said copolymers containing divinyl ether and maleic anhydride in a mole ratio of about 1:2 and having a reduced specific viscosity of from about 0.05 to about 2.0.

2. The process of claim 1 wherein said inhibiting agent is divinyl ether-maleic anhydride copolymer.

3. The process of claim 1 wherein said inhibiting agent is an ammonium salt of divinyl ether-maleic anhydride copolymer.

References Cited by the Examiner

Chemical Abstracts, 54: 21495i (1960); 59: P 4125F (1963).

JULIAN S. LEVITT, *Primary Examiner.*

J. D. GOLDBERG, *Assistant Examiner.*